US012152493B2

(12) United States Patent
Lee

(10) Patent No.: US 12,152,493 B2
(45) Date of Patent: Nov. 26, 2024

(54) TURBINE VANE HAVING SEALING ASSEMBLY, TURBINE, AND TURBOMACHINE INCLUDING SAME

(71) Applicant: DOOSAN ENERBILITY CO., LTD, Changwon-si (KR)

(72) Inventor: Hyuk Hee Lee, Gyeongsangnam-do (KR)

(73) Assignee: Doosan Enerbility Co., Ltd., Changwon-si (KR)

( * ) Notice: Subject to any disclaimer, the term of this patent is extended or adjusted under 35 U.S.C. 154(b) by 0 days.

(21) Appl. No.: 18/529,941

(22) Filed: Dec. 5, 2023

(65) Prior Publication Data

US 2024/0191632 A1 Jun. 13, 2024

(30) Foreign Application Priority Data

Dec. 9, 2022 (KR) ........................ 10-2022-0171928

(51) Int. Cl.
*F01D 11/00* (2006.01)
*F01D 9/04* (2006.01)

(52) U.S. Cl.
CPC .............. *F01D 11/005* (2013.01); *F01D 9/04* (2013.01); *F05D 2220/30* (2013.01); *F05D 2240/11* (2013.01); *F05D 2240/12* (2013.01); *F05D 2240/55* (2013.01)

(58) Field of Classification Search
CPC ...... F01D 11/005; F01D 11/00; F01D 11/001; F01D 11/08; F01D 9/04; F01D 9/041; F01D 9/042; F16J 15/0887; F05D 2240/05
See application file for complete search history.

(56) References Cited

U.S. PATENT DOCUMENTS

| | | | |
|---|---|---|---|
| 1,055,736 A | 3/1913 | Gibson | |
| 4,524,980 A | 6/1985 | Lillibridge | |
| 4,557,412 A | 12/1985 | Lillibridge | |
| 4,749,333 A | 6/1988 | Bonner et al. | |
| 5,154,577 A * | 10/1992 | Kellock | F01D 11/005 415/134 |
| 5,709,530 A | 1/1998 | Cahill | |

(Continued)

FOREIGN PATENT DOCUMENTS

| | | |
|---|---|---|
| CN | 102278147 A | 12/2011 |
| JP | H10-252413 A | 9/1998 |

(Continued)

*Primary Examiner* — J. Todd Newton
*Assistant Examiner* — Maxime M Adjagbe
(74) *Attorney, Agent, or Firm* — Shook, Hardy & Bacon L.L.P.

(57) ABSTRACT

Proposed is a turbine vane having an airfoil part and platform parts integrally formed respectively on opposite radial ends of the airfoil part, the turbine vane including a plurality of segments divided in a circumferential direction, and a sealing assembly inserted into slots formed in opposing sides of platform parts of two segments, wherein the sealing assembly includes a first sealing member mounted at a predetermined angle with respect to the circumferential direction, a second sealing member coupled to the first sealing member and bent to have a curved surface in the circumferential direction, and a third sealing member which is axially replaceably inserted into each of the slots and is elastically supported and secured by the second sealing member.

20 Claims, 4 Drawing Sheets

(56) References Cited

U.S. PATENT DOCUMENTS

| | | | |
|---|---|---|---|
| 5,882,012 | A | 3/1999 | Niwa |
| 6,079,944 | A | 6/2000 | Tomita |
| 6,086,329 | A | 7/2000 | Tomita et al. |
| 6,162,014 | A | 12/2000 | Bagepalli |
| 6,315,301 | B1 | 11/2001 | Umemura |
| 6,895,757 | B2 | 5/2005 | Mitchell |
| 7,121,800 | B2 | 10/2006 | Beattie |
| 7,261,514 | B2 | 8/2007 | London et al. |
| 8,011,892 | B2 | 9/2011 | Ramlogan |
| 8,075,255 | B2 | 12/2011 | Morgan |
| 8,182,208 | B2 | 5/2012 | Bridges |
| 8,240,985 | B2 | 8/2012 | Martin |
| 8,398,090 | B2 | 3/2013 | McMahan et al. |
| 8,579,580 | B2 | 11/2013 | Albers |
| 8,672,626 | B2 | 3/2014 | Boy |
| 8,727,710 | B2 | 5/2014 | Propheter-Hinkley |
| 9,200,519 | B2 | 12/2015 | Nereim |
| 9,255,488 | B2 | 2/2016 | Szwedowicz et al. |
| 9,732,620 | B2 | 8/2017 | Hough |
| 9,810,086 | B2 | 11/2017 | Correia |
| 9,863,257 | B2 | 1/2018 | Snyder |
| 9,869,194 | B2 | 1/2018 | Dev et al. |
| 9,874,102 | B2 | 1/2018 | Azad et al. |
| 10,072,517 | B2 | 9/2018 | Boeke |
| 10,202,853 | B2 | 2/2019 | Kleinow |
| 10,208,612 | B2 | 2/2019 | Olejarski |
| 10,267,171 | B2 * | 4/2019 | Dev ..................... F16J 15/0887 |
| 10,287,897 | B2 | 5/2019 | Paige et al. |
| 10,323,531 | B2 | 6/2019 | Bluck et al. |
| 10,633,994 | B2 | 4/2020 | Barker |
| 10,689,994 | B2 | 6/2020 | Albert |
| 10,787,923 | B2 | 9/2020 | Quennhen |
| 10,787,924 | B2 | 9/2020 | Quennehen |
| 10,801,347 | B2 | 10/2020 | Joo |
| 11,111,823 | B2 | 9/2021 | Jarrossay |
| 11,187,094 | B2 | 11/2021 | Feldmann |
| 11,215,063 | B2 | 1/2022 | Sarawate |
| 11,506,085 | B2 | 11/2022 | Jarrossay |
| 11,840,930 | B2 | 12/2023 | Propheter-Hinckley |
| 2003/0039542 | A1 | 2/2003 | Cromer |
| 2010/0247300 | A1 | 9/2010 | Morgan |
| 2011/0262274 | A1 | 10/2011 | Boy |
| 2014/0119899 | A1 | 5/2014 | Nereim |
| 2014/0348642 | A1 * | 11/2014 | Weber ................... F01D 11/005 415/170.1 |
| 2015/0056068 | A1 | 2/2015 | Wiebe |
| 2016/0222800 | A1 | 8/2016 | Kleinow |
| 2017/0159478 | A1 | 6/2017 | Dev et al. |
| 2017/0240824 | A1 | 8/2017 | Asad et al. |
| 2019/0093493 | A1 | 3/2019 | Soda et al. |
| 2019/0120073 | A1 | 4/2019 | Joo |
| 2019/0203606 | A1 * | 7/2019 | Sarawate .............. F01D 11/005 |
| 2021/0164366 | A1 | 6/2021 | Jarrossay |
| 2021/0355844 | A1 | 11/2021 | Jarrossay |
| 2022/0195893 | A1 | 6/2022 | Schiessl |

FOREIGN PATENT DOCUMENTS

| | | | |
|---|---|---|---|
| JP | 34626952 | B2 | 11/2003 |
| JP | 2009203948 | A | 9/2009 |
| JP | 2010242748 | A | 10/2010 |
| JP | 2011032985 | A | 2/2011 |
| JP | 2012007607 | A | 1/2012 |
| JP | 2012149527 | A | 8/2012 |
| JP | 2012-180830 | A | 9/2012 |
| JP | 2013-155680 | A | 8/2013 |
| JP | 2016094857 | A | 5/2016 |
| JP | 2017-502195 | A | 1/2017 |
| JP | 6173811 | B2 | 8/2017 |
| JP | 2017187025 | A | 10/2017 |
| JP | 6312929 | B2 | 3/2018 |
| JP | 6554882 | B2 | 8/2019 |
| JP | 6673482 | B2 | 3/2020 |
| JP | 2021099095 | A | 7/2021 |
| JP | 2021156286 | A | 10/2021 |
| KR | 10-2019-0044834 | A | 5/2019 |
| KR | 2019-0044834 | A | 5/2019 |

* cited by examiner

TURBINE VANE HAVING SEALING ASSEMBLY, TURBINE, AND TURBOMACHINE INCLUDING SAME

CROSS REFERENCE TO RELATED APPLICATION

The present application claims priority to Korean Patent Application No. 10-2022-0171928, filed on Dec. 9, 2022, the entire contents of which are incorporated herein for all purposes by this reference.

BACKGROUND

1. Technical Field

The present disclosure relates to a turbine vane having a sealing assembly, a turbine, and a turbomachine including the same.

2. Description of the Related Art

A turbomachine is a mechanical device that obtains power through impulsive or reaction force by using the flow of fluid such as steam or gas. A turbomachine comes in various forms, such as a steam turbine that uses steam and a gas turbine that uses high-temperature combustion gas. Generally, a turbomachine includes a turbine with a rotor to generate power. High-temperature fluid is introduced into the turbine and affects the lifespan of the turbine. To solve this problem, cooling the turbine is a very important technology.

For example, in the case of a gas turbine, some of air compressed by a compressor is introduced into the turbine so as to cool the turbine. The compressed air introduced from the compressor circulates inside the turbine and cools the turbine. During this cooling process, a sealing member is used to prevent compressed air from leaking between turbine disks.

The sealing member may be damaged by vibration or impact caused by the rotation of the rotor during the operation of the turbine, and if damaged, is required to be repaired or replaced. Accordingly, when designing a sealing member, it is necessary to ensure that the sealing member is not easily damaged and that even if the sealing member is damaged, the sealing member can be easily repaired or replaced.

The turbine has a plurality of turbine vanes and turbine blades mounted in multiple stages thereto, wherein each of the turbine vanes is composed of a plurality of segments divided in a circumferential direction. A metal sealing member is inserted between two segments of the turbine vane to prevent cooling air from leaking.

However, the conventional sealing member required the cumbersome process of disassembling the segments of the turbine vane, which is a fixed body, mounting the sealing member between the segments, and then reassembling the parts.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and an objective of the present disclosure is to provide a turbine vane, a turbine, and a turbomachine including the same, in which a sealing assembly is inserted into a position between segments of the turbine vane which is a fixed body without disassembling the segments so that the sealing assembly can be easily assembled therewith.

In an aspect of the present disclosure, there is provided a turbine vane having an airfoil part and platform parts integrally formed respectively on opposite radial ends of the airfoil part, the turbine vane including: a plurality of segments divided in a circumferential direction, and a sealing assembly inserted into slots formed in opposing sides of platform parts of two segments, wherein the sealing assembly includes: a first sealing member mounted at a predetermined angle with respect to the circumferential direction, a second sealing member coupled to the first sealing member and bent to have a curved surface in the circumferential direction, and a third sealing member which is axially replaceably inserted into each of the slots and is elastically supported and secured by the second sealing member.

The first sealing member and the second sealing member may include one pair of first and second sealing members provided on each of opposite ends of the third sealing member.

The second sealing member may include: a coupling part coupled to the first sealing member, and an elastic support part configured to extend and bend from the coupling part and press and secure the third sealing member.

The coupling part of the second sealing member may be welded and coupled to the first sealing member.

The elastic support part of the second sealing member may be formed in a shape of a radially convex curved surface and may be elastically transformed so that a radius of curvature of the elastic support part is increased by the third sealing member inserted into the slot.

The second sealing member may be formed to have a thickness of half a thickness of the third sealing member or less.

The third sealing member may be inserted into the slot by sliding from one longitudinal side thereof.

A turbine of the present disclosure having turbine blades and turbine vanes mounted therein, with the turbine blades being rotated by combustion gas discharged from a combustor, wherein each of the turbine vanes includes the airfoil part and the platform parts integrally formed respectively on opposite radial ends of the airfoil part; consists of the plurality of segments divided in a circumferential direction; and includes the sealing assembly inserted into the slots formed in opposing sides of platform parts of two segments, wherein the sealing assembly includes: the first sealing member mounted at a predetermined angle with respect to the circumferential direction, the second sealing member coupled to the first sealing member and bent to have a curved surface in the circumferential direction, and the third sealing member which is axially replaceably inserted into each of the slots and is elastically supported and secured by the second sealing member.

The first sealing member and the second sealing member may include one pair of first and second sealing members provided on each of opposite ends of the third sealing member.

The second sealing member may include: the coupling part coupled to the first sealing member, and the elastic support part configured to extend and bend from the coupling part and press and secure the third sealing member.

The coupling part of the second sealing member may be welded and coupled to the first sealing member.

The elastic support part of the second sealing member may be formed in a shape of a radially convex curved surface and may be elastically transformed so that a radius of curvature of the elastic support part is increased by the third sealing member inserted into the slot.

The second sealing member may be formed to have a thickness of half a thickness of the third sealing member or less.

The third sealing member may be inserted into the slot by sliding from one longitudinal side thereof.

A turbomachine of the present disclosure includes: a compressor configured to suck and compress external air; the combustor configured to mix fuel with air compressed in the compressor and combust a mixture of the fuel and the compressed air; and the turbine having turbine blades and turbine vanes mounted therein, the turbine blades being rotated by combustion gas discharged from the combustor, wherein each of the turbine vanes comprises the airfoil part and the platform parts integrally formed respectively on opposite radial ends of the airfoil part; consists of the plurality of segments divided in a circumferential direction; and includes the sealing assembly inserted into the slots formed in opposing sides of platform parts of two segments, wherein the sealing assembly includes: the first sealing member mounted at a predetermined angle with respect to the circumferential direction, the second sealing member coupled to the first sealing member and bent to have a curved surface in the circumferential direction, and the third sealing member which is axially replaceably inserted into each of the slots and is elastically supported and secured by the second sealing member.

The first sealing member and the second sealing member may include one pair of first and second sealing members provided on each of opposite ends of the third sealing member.

The second sealing member may include: the coupling part welded and coupled to the first sealing member, and the elastic support part configured to extend and bend from the coupling part and press and secure the third sealing member.

The elastic support part of the second sealing member may be formed in a shape of a radially convex curved surface and may be elastically transformed so that a radius of curvature of the elastic support part is increased by the third sealing member inserted into the slot.

The second sealing member may be formed to have a thickness of half a thickness of the third sealing member or less.

The third sealing member may be inserted into the slot by sliding from one longitudinal side thereof.

According to the turbine vane provided with the sealing assembly of the present disclosure, the turbine, and the turbomachine including the same, in which the sealing assembly is inserted into a position between segments of the turbine vane which is a fixed body without disassembling the segments so that the sealing assembly can be easily assembled therewith.

DETAILED DESCRIPTION

Figure 1:
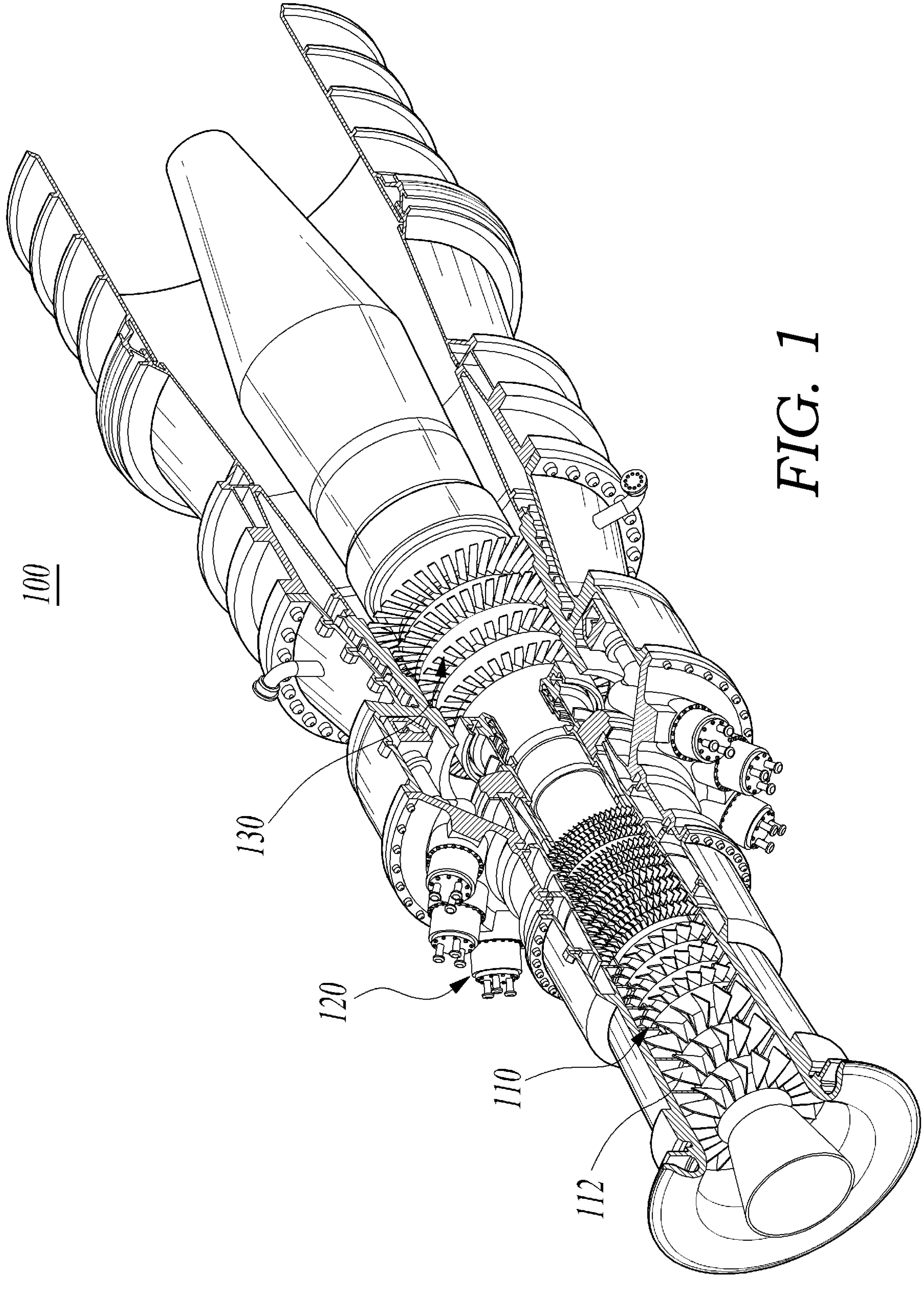
FIG. 1 is a partially cut-away perspective view of a turbomachine according to the embodiment of the present disclosure.

Since the present disclosure can be modified in various ways and can have various embodiments, specific embodiments will be exemplified and explained in detail in the detailed description. However, it should be noted that the present disclosure is not limited thereto, and may include all of modifications, equivalents, and substitutions within the spirit and scope of the present disclosure.

Terms used herein are used to merely describe specific embodiments, and are not intended to limit the present disclosure. As used herein, an element expressed as a singular form includes a plurality of elements, unless the context clearly indicates otherwise. Further, it will be understood that the term “comprising” or “including” specifies the presence of stated features, numbers, steps, operations, elements, parts, or combinations thereof, but does not preclude the presence or addition of one or more other features, numbers, steps, operations, elements, parts, or combinations thereof.

Hereinafter, preferred embodiments of the present disclosure will be described in detail with reference to the accompanying drawings. It is noted that like elements are denoted in the drawings by like reference symbols as whenever possible. Further, the detailed description of known functions and configurations that may obscure the gist of the present disclosure will be omitted. For the same reason, some of the elements in the drawings are exaggerated, omitted, or schematically illustrated.

In the present disclosure, a turbomachine may be a variety of devices including a steam turbine and a gas turbine. Hereinafter, the turbomachine will be described as a gas turbine but is not limited thereto.

Figure 2:
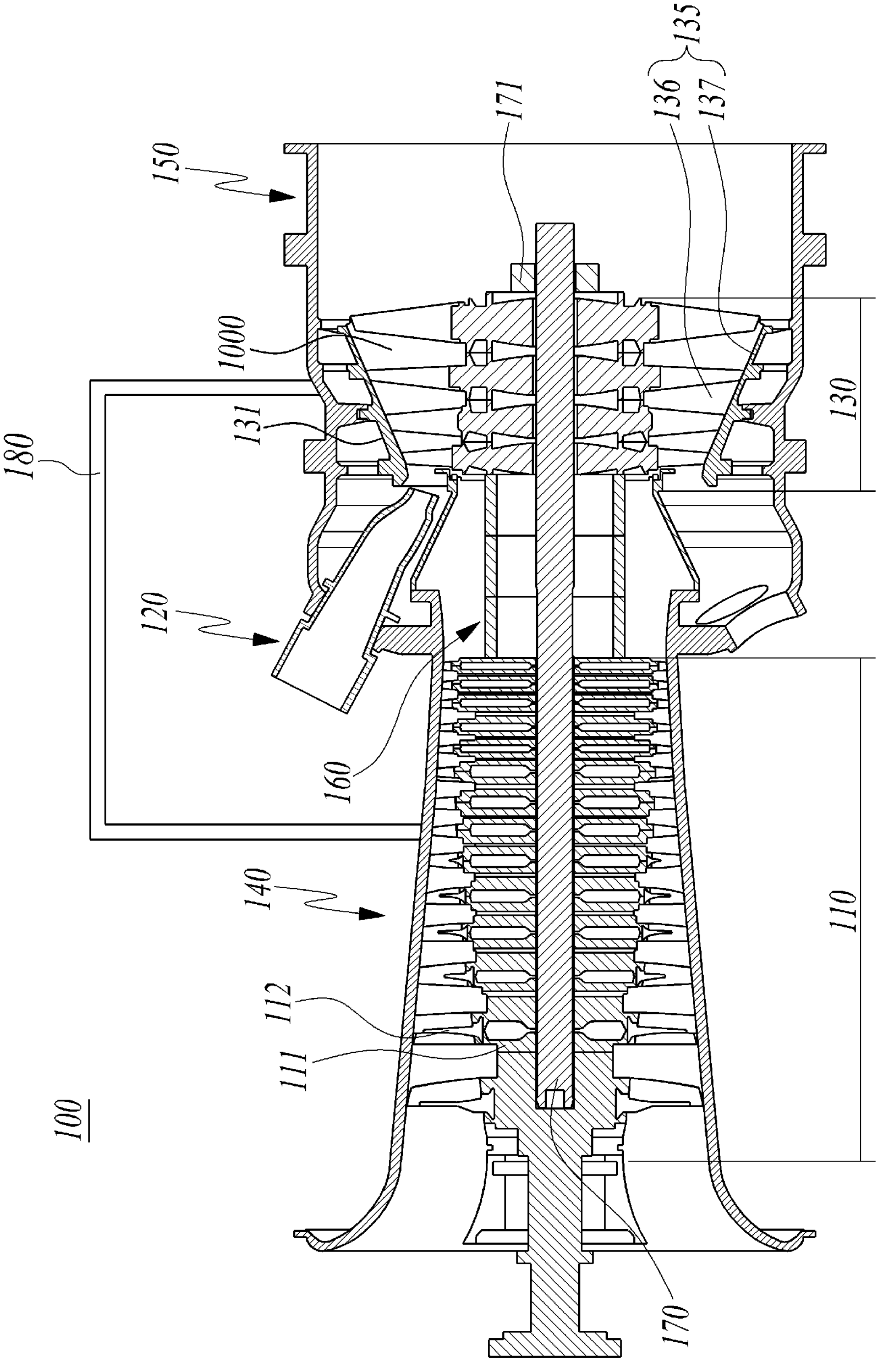
FIG. 2 is a cross-sectional view illustrating a schematic structure of the turbomachine according to the embodiment of the present disclosure.
Figure 3:
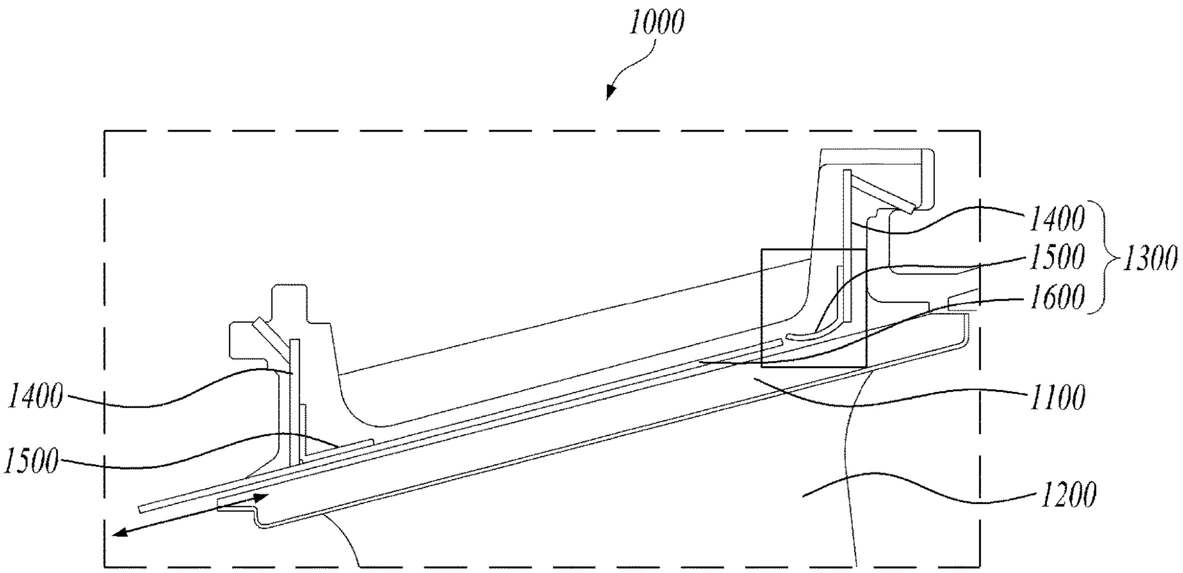
FIG. 3 is a cross-sectional view conceptually illustrating a turbine vane and a sealing assembly according to the embodiment of the present disclosure.

FIG. 1 is a partially cut-away perspective view of a turbomachine according to the embodiment of the present disclosure; FIG. 2 is a cross-sectional view illustrating a schematic structure of the turbomachine according to the embodiment of the present disclosure; and FIG. 3 is a cross-sectional view conceptually illustrating a turbine vane and a sealing assembly according to the embodiment of the present disclosure.

As illustrated in FIGS. 1 and 2, the turbomachine 100 according to the embodiment of the present disclosure includes a compressor 110, a combustor 120, a turbine 130, a housing 140, and a diffuser 150. The compressor 110 sucks and compresses external air and sends the air to the combustor 120. The combustor 120 mixes the compressed air and fuel and combusts the air-fuel mixture to generate combustion gas. In the turbine 130, combustion gas rotates turbine rotors 135 to generate power. The appearance of the turbomachine 100 is determined by the housing 140. The diffuser 150 through which combustion gas passing through the turbine 130 is discharged is located at the rear of the housing 140.

The compressor 110 has a structure in which internal space gradually decreases to a rear stage thereof from a front stage thereof so that sucked air can be compressed. The compressor 110 is provided with a compressor casing, wherein a compressor rotor and compressor vanes are located inside the compressor casing.

The compressor rotor includes a plurality of compressor disks 111 and a plurality of compressor blades 112. The plurality of compressor disks 111 are axially arranged with a tie rod 170 passing through a central part of the compressor disks. Each of the compressor disks 111 is not spaced apart from each other in the axial direction by the tie rod 170. Since opposing surfaces of adjacent compressor disks 111 are pressed by the tie rod 170, the adjacent compressor disks 111 are arranged so as not to rotate relative to each other.

The plurality of compressor blades 112 are radially coupled to the outer circumferential surface of the compressor disk 111. Each of the blades 112 is provided with a dovetail part to be coupled to the compressor disk 111. Based on the same stage, each of the plurality of compressor vanes, which is annularly installed on the inner circumferential surface of the compressor casing, is disposed between the plurality of compressor blades 112. Unlike the compressor disk 111, the compressor vanes maintain a fixed state so as not to rotate, and align the flow of compressed air passing through the compressor blades 112 to guide the compressed air to the compressor blades 112 located at a downstream side.

The tie rod 170 is disposed to pass through the centers of the plurality of compressor disks 111 and a plurality of turbine disks 136, and a first end of the tie rod 170 is coupled inside the compressor disk 111 located at the most front stage of the compressor 110, and a second end of the tie rod 170 is coupled by a fixing nut 171.

The tie rod 170 may have various shapes depending on the turbomachine 100. For example, one tie rod 170 may pass through the centers of the compressor disks 111 and the turbine disks 136 as illustrated in FIG. 2, a plurality of tie rods 170 may be arranged circumferentially, or a combination thereof may be used.

The compressor 110 may be provided with a deswirler serving as a guide so as to adjust a flow angle of a fluid entering the inlet of the combustor 120 to a designed flow angle.

Air compressed in the compressor 110 moves to the combustor 120. The combustor 120 may include multiple combustors arranged inside a casing formed in a cell shape. The combustor 120 may be provided with a burner having a fuel injection nozzle, a combustor liner forming a combustion chamber, and transition piece which is a connection part between the combustor 120 and the turbine 130.

The combustor liner provides a combustion space in which the fuel injected by the fuel nozzle is mixed with the compressed air of the compressor and the fuel-air mixture is combusted. The liner may include a flame canister providing the combustion space in which the fuel-air mixture is combusted, and a flow sleeve forming an annular space by surrounding the flame canister.

A fuel nozzle is coupled to the front end of the liner, and an igniter plug is coupled to the side wall of the liner. A transition piece is connected to a rear end of the liner so as to transmit the combustion gas combusted by the igniter plug to the turbine side.

An outer wall of the transition piece is cooled by the compressed air supplied from the compressor so as to prevent thermal breakage due to the high temperature combustion gas. To this end, the transition piece is provided with cooling holes through which compressed air is injected into and cools the inside of the transition piece and flows towards the liner.

The air that has cooled the transition piece flows into the annular space of the liner and compressed air is supplied as a cooling air to the outer wall of the liner from the outside of the flow sleeve through cooling holes provided in the flow sleeve so that both air flows may collide with each other.

High-temperature and high-pressure combustion gas generated from the combustor 120 is supplied to the turbine 130. The high-temperature and high-pressure combustion gas supplied to the turbine 130 expands as the combustion gas passes through the inside of the turbine 130, and accordingly applies impulse and reaction force to the turbine blades 137 to generate rotational torque. The generated rotational torque is used to drive a generator. A portion of the rotational torque may be transmitted to the compressor 110 through a torque tube 160 and used as power required to drive the compressor 110.

The turbine 130 includes the plurality of turbine rotors 135. The turbine rotors 135 is provided with turbine disks 136, and a plurality of turbine blades 137 disposed radially from each of the turbine disks 136. The turbine disks 136 and the plurality of turbine blades 137 are arranged in a multi-stage structure in which the turbine disks and turbine blades are spaced apart from each other along the flow direction of combustion gas. Based on the same stage, each of a plurality of turbine vanes 1000, which is annularly installed in a turbine casing 131 is provided between the turbine blades 137. The turbine vane 1000 guides the flow direction of combustion gas passing through the turbine blades 137.

The turbine blades 137 directly contact high-temperature and high-pressure combustion gas. The turbine blades 137 may be deformed by the combustion gas, and the turbine 130 may be damaged due to the deformation of the turbine blades 137. In order to prevent the deformation caused by high temperatures, a branch flow path 180 may be formed between the compressor 110 and the turbine 130 so as to branch off some of air inside the compressor 110, which has a relatively lower temperature than the combustion gas, and to supply the branched air to the turbine blades 137.

The branch flow path 180 may be formed on the outside of the compressor casing, or may be formed inside the compressor disk 111 by passing through the compressor disk 111. The branch flow path 180 supplies compressed air branched from the compressor 110 to the inside of the turbine disk 136. The compressed air supplied to the inside of the turbine disk 136 flows outward in a radial direction and is supplied to the inside of the turbine blades 137 to cool the turbine blades 137. At this time, compressed air exists inside the turbine disk 136 and combustion gas exists outside the turbine disk 136. Accordingly, sealing is required to be performed between an adjacent turbine disk 136 and an adjacent turbine disk 136, and for this purpose, a sealing member in the form of a metal band is used.

The turbine vane 1000 may include an airfoil part 1200, and platform parts 1100 integrally formed respectively on opposite radial ends of the airfoil part. Unlike the turbine blades 137, the turbine vane 1000, which is a fixed body that does not rotate, may include an airfoil part 1200 which guides combustion gas moving past the turbine blades 137 and one pair of platform parts 1100 integrally formed on the opposite radial ends of the airfoil part.

The turbine vane 1000 may be composed of a plurality of segments by dividing the platform parts 1100 in the circumferential direction for each of one or more airfoil parts 1200.

A pair of slots 1110 is formed in the opposing sides of the platform parts 1100 of two circumferentially opposing segments, and the sealing assembly 1300 of the present disclosure may be inserted and mounted into the pair of slots 1110.

As illustrated in FIG. 3, the sealing assembly 1300 may include a first sealing member 1400 mounted at a predetermined angle with respect to the circumferential direction, a second sealing member 1500 coupled to the first sealing member and bent to form a curved surface in the circumferential direction, and a third sealing member 1600 which is axially replaceably inserted into each of the slots 1110 and is elastically supported and secured by the second sealing member.

The slot 1110 may be formed in a side of each of the platform parts 1100 of the turbine vane 1000 by corresponding to the insertion form of the first sealing member 1400, the second sealing member 1500, and the third sealing member 1600. That is, the slot 1110 may generally include a circumferential slot part and one pair of radial slot parts connected near opposite ends thereof.

The first sealing member 1400 may be generally arranged at an angle close to the radial direction.

The second sealing member 1500 is formed by bending a middle portion thereof, and may be arranged so that a first side part thereof is coupled to the first sealing member 1400 and a second side part is bent to contact the third sealing member 1600.

The third sealing member 1600 is formed in the form of a straight metal band and may be mounted by being inserted into the slot 1110 from a first end thereof to a second end thereof in a circumferential direction.

The first sealing member 1400 and the second sealing member 1500 may include one pair of first and second sealing members provided on each of opposite ends of the third sealing member 1600. The two pairs of first sealing member 1400 and second sealing member 1500 may be formed in shapes different from each other as described later.

Figure 4:
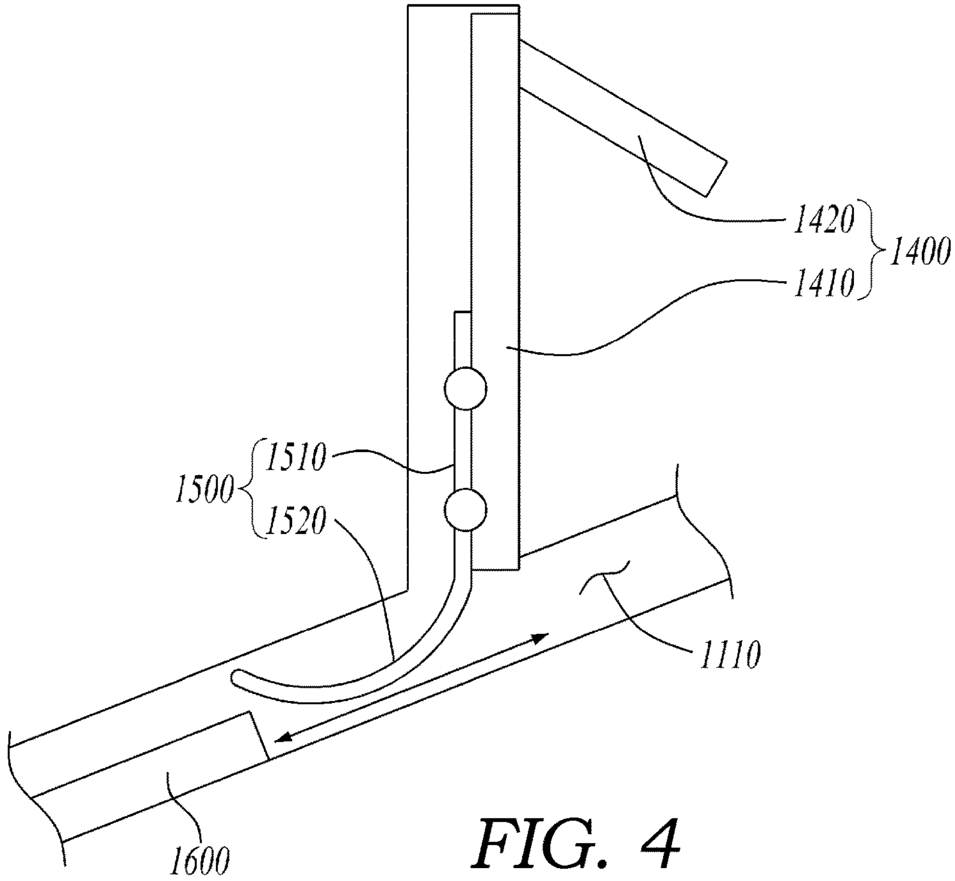
FIG. 4 is a cross-sectional view conceptually illustrating the form of a third sealing member before the third sealing member is completely inserted into a slot in the sealing assembly of the present disclosure.
Figure 5:
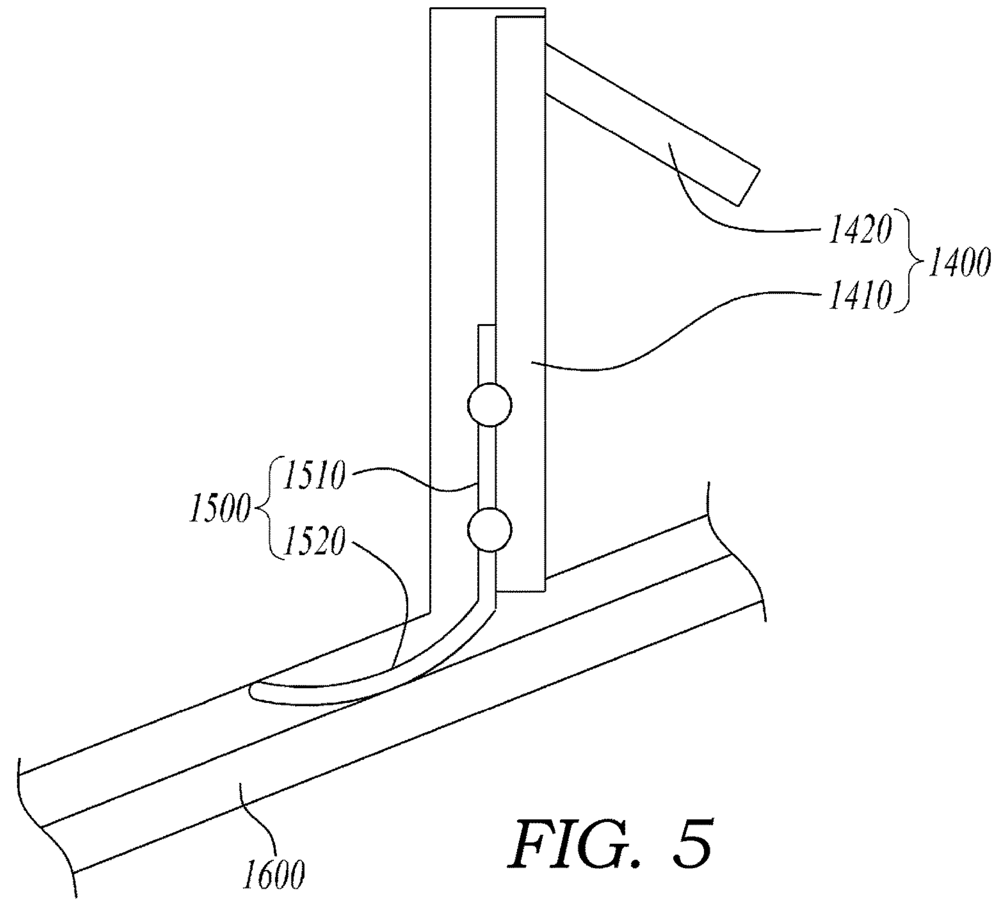
FIG. 5 is a cross-sectional view conceptually illustrating the form of the third sealing member after the third sealing member is completely inserted into the slot in the sealing assembly of the present disclosure.
Figure 6:
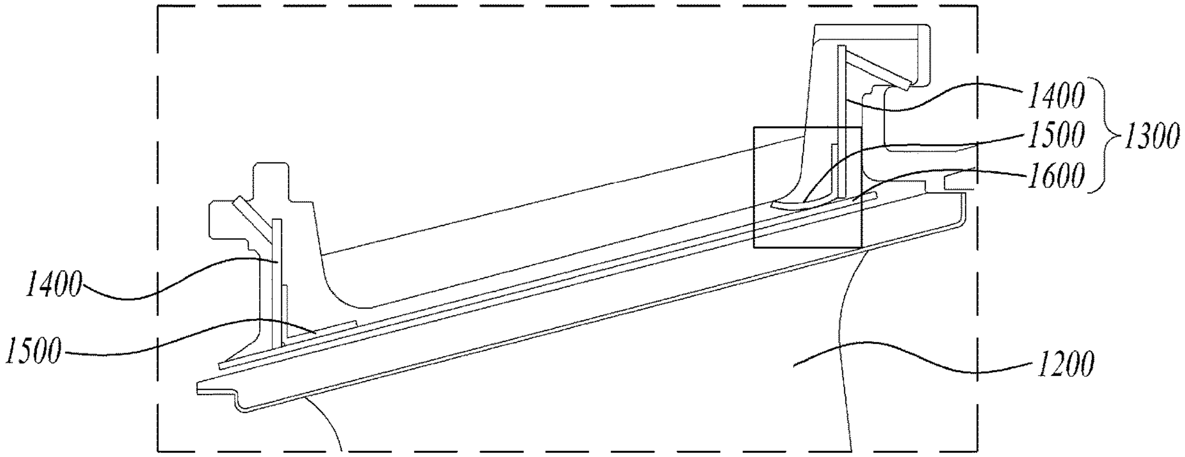
FIG. 6 is a cross-sectional view conceptually illustrating the form of the third sealing member assembled after being completely inserted into the slot in the sealing assembly of the present disclosure.

FIG. 4 is a cross-sectional view conceptually illustrating the form of the third sealing member before the third sealing member is completely inserted into a slot in the sealing assembly of the present disclosure; FIG. 5 is a cross-sectional view conceptually illustrating the form of the third sealing member after the third sealing member is completely inserted into the slot in the sealing assembly of the present disclosure; and FIG. 6 is a cross-sectional view conceptually illustrating the form of the third sealing member assembled after being completely inserted into the slot in the sealing assembly of the present disclosure.

The first sealing member 1400 may include a band-shaped main body part 1410 arranged generally in a circumferential direction, and an extension part 1420 formed by extending outward in the width direction of the main body part. The main body part 1410 and the extension part 1420 are each formed in the form of a straight metal band and may be connected to each other to have a predetermined angle therebetween.

The second sealing member 1500 may include a coupling part 1510 coupled to the first sealing member 1400, and an elastic support part 1520 which extends and bends from the coupling part and presses and secures the third sealing member 1600.

The coupling part 1510 is formed in the form of a straight band and can be coupled to the lower inner surface of the main body part 1410 of the first sealing member 1400. The coupling part 1510 may be coupled to the main body part 1410 by a plurality of screws or welding.

The elastic support part 1520 may extend integrally from the lower end of the coupling part 1510, and may be formed in the form of a curved band with a constant radius of curvature or an increasing radius of curvature. The elastic support part 1520 may be elastically transformed by the inserted third sealing member 1600, and press and secure the third sealing member 1600 by restoring force thereof so that a gap between the elastic support part 1520 and the third sealing member 1600 can be sealed.

It is preferable that the coupling part 1510 of the second sealing member 1500 is welded and coupled to the main body part 1410 of the first sealing member 1400. The coupling part 1510 may be coupled to the main body part 1410 by spot welding or line welding at several positions. In FIGS. 4 and 5, circles formed in the coupling part 1510 and the main body part 1410 represent welding areas.

The elastic support part 1520 of the second sealing member 1500 may be formed in a radially convex curved shape, and may be elastically transformed by the third sealing member 1600 inserted into the slot 1110 so that the radius of curvature of the elastic support part 1520 is increased.

As illustrated in FIG. 4, the elastic support part 1520 may be formed in the form of a curved band that is convex inward in a radial direction. When the third sealing member 1600 is inserted, the front end part of the elastic support part 1520 contacts the upper side of the slot 1110, so the elastic support part 1520 is preferably formed to be round. However, before inserting the third sealing member 1600, the front end part of the elastic support part 1520 may not contact the upper side of the slot 1110.

As illustrated in FIG. 5, when the third sealing member 1600 is inserted, the third sealing member 1600 pushes the convex surface of the elastic support part 1520, and thus the elastic support part 1520 is elastically transformed to increase the radius of curvature thereof. The elastic support part 1520, which has been elastically transformed, presses the third sealing member 1600 by the restoring force thereof, thereby securing the third sealing member 1600 and preventing a gap therebetween.

The second sealing member 1500 may be formed to have a thickness of half a thickness of the third sealing member 1600 or less. Particularly, since the elastic support part 1520 of the second sealing member 1500 is elastically transformed, the elastic support part 1520 may be made of a metal material with high tensile strength and may be formed to have a thinner thickness than the thickness of the third sealing member 1600. The elastic support part 1520 may be manufactured to have an appropriate modulus of elasticity so that the elastic support part 1520 can be easily elastically transformed by the third sealing member 1600 and have significant restoring force.

Meanwhile, as illustrated in FIGS. 3 and 6, the third sealing member 1600 may be inserted into the slot 1110 by sliding from one longitudinal side of the slot 1110.

In the drawing, a left second sealing member 1500 is illustrated to have a different shape from a right second sealing member 1500. The right second sealing member 1500 is provided with the coupling part 1510 and the elastic support part 1520 as described above, but the left second sealing member 1500 may include a coupling part and a supporting part simply bent from the coupling part. The supporting part of the left second sealing member 1500 may be formed in the form of a straight band, and may be formed integrally with the coupling part by being bent at a predetermined angle therefrom.

Relative to FIG. 3, the third sealing member 1600 may be inserted into the slot 1110 by sliding from left to right. In the left second sealing member 1500, the front end part of the supporting part is arranged rightward, and thus when the third sealing member 1600 is inserted, the third sealing member 1600 may not interfere with the front end part of the supporting part. In addition, in the right second sealing member 1500, the front end part of the elastic support part 1520 is arranged by being bent upward, and thus when the third sealing member 1600 is inserted, the third sealing member 1600 may not interfere with the front end part of the elastic support part 1520.

Accordingly, as illustrated in FIG. 6, when inserting and installing the sealing assembly into the slot of the turbine vane, the sealing assembly does not interfere with other parts, so the sealing assembly can be easily installed and assembled even without disassembling the parts.

While the embodiments of the present disclosure have been described, it will be apparent to those skilled in the art that various modifications and variations can be made in the present disclosure through addition, change, omission, or substitution of components without departing from the spirit of the disclosure as set forth in the appended claims, and such modifications and changes may also be included within the scope of the present disclosure.

What is claimed is:

1. A turbine vane having an airfoil part and platform parts integrally formed respectively on opposite radial ends of the airfoil part, the turbine vane comprising:
- a plurality of segments divided in a circumferential direction, and
- a sealing assembly inserted into slots formed in opposing sides of platform parts of two segments,
- wherein the sealing assembly comprises:
- a first sealing member mounted at a predetermined angle with respect to the circumferential direction,
- a second sealing member coupled to the first sealing member and bent to have a curved surface in the circumferential direction, wherein the second sealing member is configured to move between a first position and a second position, and
- a third sealing member which is axially replaceably inserted into each of the slots and is elastically supported and secured by the second sealing member; and
- wherein the second sealing member is in the first position prior to contact with the third sealing member, and wherein the second sealing member is in the second position when the second sealing member contacts the third sealing member.

2. The turbine vane of claim 1, wherein the first sealing member and the second sealing member comprise one pair of first and second sealing members provided on each of opposite ends of the third sealing member.

3. The turbine vane of claim 1, wherein the second sealing member comprises:
- a coupling part coupled to the first sealing member, and
- an elastic support part configured to extend and bend from the coupling part and press and secure the third sealing member.

4. The turbine vane of claim 3, wherein the coupling part of the second sealing member is welded and coupled to the first sealing member.

5. The turbine vane of claim 3, wherein the elastic support part of the second sealing member is formed in a shape of a radially convex curved surface and is elastically transformed so that a radius of curvature of the elastic support part is increased by the third sealing member inserted into the slot.

6. The turbine vane of claim 3, wherein the second sealing member is formed to have a thickness of half a thickness of the third sealing member or less.

7. The turbine vane of claim 3, wherein the third sealing member is inserted into the slot by sliding from one longitudinal side thereof.

8. A turbine having turbine blades and turbine vanes mounted therein, with the turbine blades being rotated by combustion gas discharged from a combustor, wherein each of the turbine vanes comprises an airfoil part and platform parts integrally formed respectively on opposite radial ends of the airfoil part;
- consists of a plurality of segments divided in a circumferential direction; and
- comprises a sealing assembly inserted into slots formed in opposing sides of platform parts of two segments,
- wherein the sealing assembly comprises:
- a first sealing member mounted at a predetermined angle with respect to the circumferential direction,
- a second sealing member coupled to the first sealing member and bent to have a curved surface in the circumferential direction, wherein the second sealing member is configured to move between a first position and a second position,
- a third sealing member which is axially replaceably inserted into each of the slots and is elastically supported and secured by the second sealing member; and
- wherein the second sealing member is in the first position prior to contact with the third sealing member, and wherein the second sealing member is in the second position when the second sealing member contacts the third sealing member.

9. The turbine of claim 8, wherein the first sealing member and the second sealing member comprise one pair of first and second sealing members provided on each of opposite ends of the third sealing member.

10. The turbine of claim 8, wherein the second sealing member comprises:
- a coupling part coupled to the first sealing member, and
- an elastic support part configured to extend and bend from the coupling part and press and secure the third sealing member.

11. The turbine of claim 10, wherein the coupling part of the second sealing member is welded and coupled to the first sealing member.

12. The turbine of claim 10, wherein the elastic support part of the second sealing member is formed in a shape of a radially convex curved surface and is elastically transformed so that a radius of curvature of the elastic support part is increased by the third sealing member inserted into the slot.

13. The turbine of claim 10, wherein the second sealing member is formed to have a thickness of half a thickness of the third sealing member or less.

14. The turbine of claim 10, wherein the third sealing member is inserted into the slot by sliding from one longitudinal side thereof.

15. A turbomachine comprising:
- a compressor configured to suck and compress external air;

a combustor configured to mix fuel with air compressed in the compressor and combust a mixture of the fuel and the compressed air; and a turbine having turbine blades and turbine vanes mounted therein, the turbine blades being rotated by combustion gas discharged from the combustor, wherein each of the turbine vanes comprises an airfoil part and platform parts integrally formed respectively on opposite radial ends of the airfoil part;

consists of a plurality of segments divided in a circumferential direction; and comprises a sealing assembly inserted into slots formed in opposing sides of platform parts of two segments, wherein the sealing assembly comprises:

a first sealing member mounted at a predetermined angle with respect to the circumferential direction, a second sealing member coupled to the first sealing member and bent to have a curved surface in the circumferential direction, wherein the second sealing member is configured to move between a first position and a second position, a third sealing member which is axially replaceably inserted into each of the slots and is elastically supported and secured by the second sealing member; and wherein the second sealing member is in the first position prior to contact with the third sealing member, and wherein the second sealing member is in the second position when the second sealing member contacts the third sealing member.

16. The turbomachine of claim 15, wherein the first sealing member and the second sealing member comprise one pair of first and second sealing members provided on each of opposite ends of the third sealing member.

17. The turbomachine of claim 15, wherein the second sealing member comprises:

a coupling part welded and coupled to the first sealing member, and an elastic support part configured to extend and bend from the coupling part and press and secure the third sealing member.

18. The turbomachine of claim 17, wherein the elastic support part of the second sealing member is formed in a shape of a radially convex curved surface and is elastically transformed so that a radius of curvature of the elastic support part is increased by the third sealing member inserted into the slot.

19. The turbomachine of claim 17, wherein the second sealing member is formed to have a thickness of half a thickness of the third sealing member or less.

20. The turbomachine of claim 17, wherein the third sealing member is inserted into the slot by sliding from one longitudinal side thereof.

* * * * *